INVENTORS
E. N. BARNES
T. J. WINDLE

BY *Young & Quigg*

ATTORNEYS

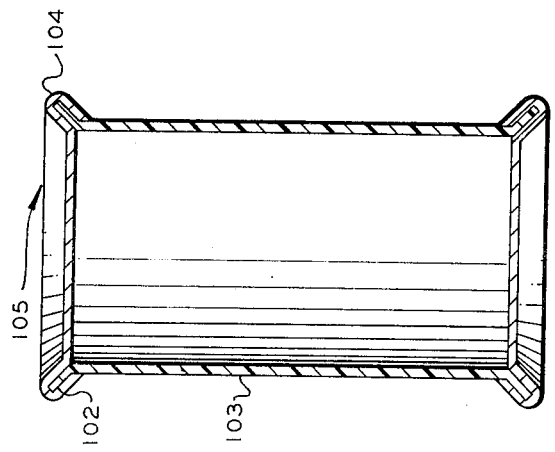
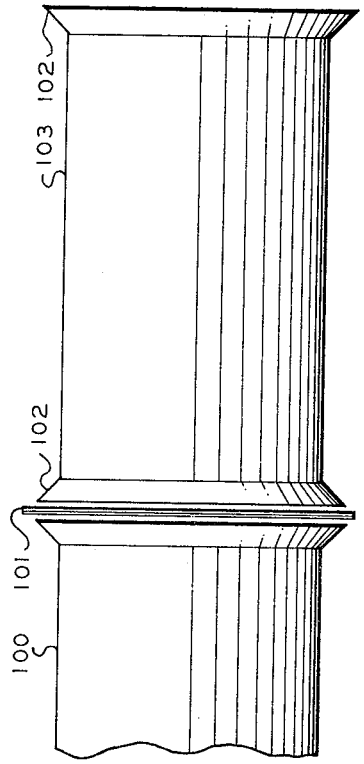
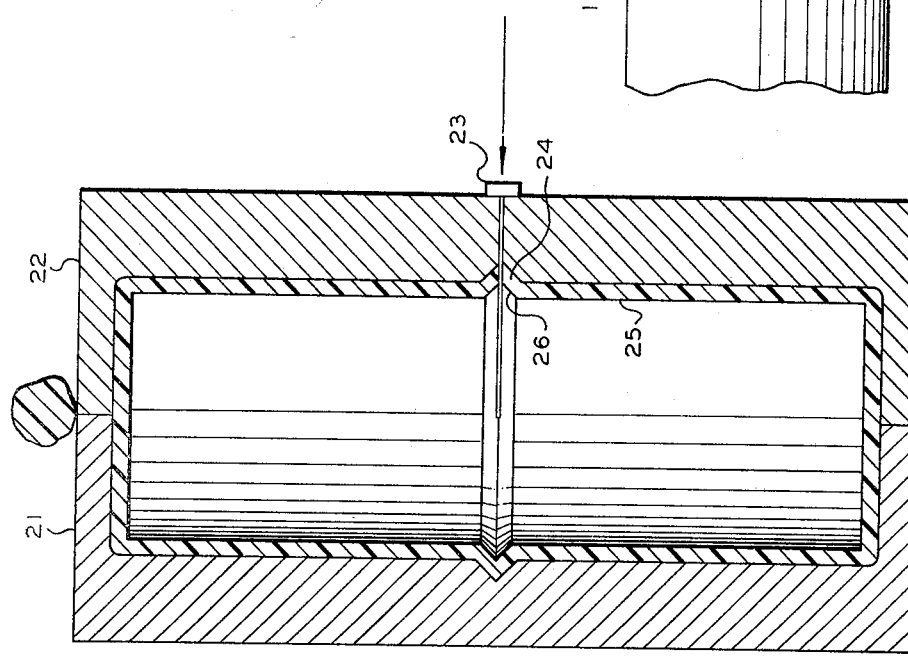

United States Patent Office 3,507,086
Patented Apr. 21, 1970

3,507,086
CONTAINER FABRICATION
Estil N. Barnes and Tom J. Windle, Bartlesville, Okla., assignors to Phillips Petroleum Company, a corporation of Delaware
Filed Feb. 27, 1967, Ser. No. 618,795
Int. Cl. B65b 43/00
U.S. Cl. 53—29                             2 Claims

ABSTRACT OF THE DISCLOSURE

A method of manufacturing container bodies by forming an elongated tube of plastic material having at least one equal spaced ridge about its periphery, severing the tube into segments, each having at least one open-flared end, by cutting through the apex of each of the ridges. A container can be formed, for example, by crimping a metal closure around the flanges on the flared ends at one or both ends of each segment as desired.

---

This invention relates to containers. In another aspect, this invention relates to a novel method of fabrication of containers.

Conventional methods of making hollow thermoplastic containers, such as blow molding or injection molding, are relatively slow because one complete molding cycle generally only produces one formed article. For example, when using conventional blow molding machines, thermoplastic tubing in a moldable condition is enclosed by a mold and then expanded to the shape of the mold to produce one formed article. Similarly, injection molding involves forcing molten thermoplastic material into an injection mold of the configuration desired to form one of the finished articles. Additionally, the containers formed by the above methods must then be sealed after the desired amount of dispensable material has been deposited therein.

Also, in many operations it is desirable to crimp a metal sealing cap around an opening or openings such as a neck on a thermoplastic container. When doing this it is necessary that the material around the neck of each opening be outwardly flared to form a flange which extends beyond a narrower neck or body portion so that the metal cap can be crimped or rolled on each flange. This flange will provide for the required sealing effect and establish a tightly sealed container which can be opened by removing the metal cap which is typical for soft drink bottles or by punching a hole or holes through the metal top which is typical for motor oil dispensing containers. The flare ended container bodies can be produced by the one-step injection or blow molding operations described above wherein the flanges are molded on the container body or by a two-step method comprising forming a container body which has no flanges around its openings and subsequently flaring the openings by heat and pressure sizing operations. Thus, these combined molding and flaring operations require complicated machinery and high costs due to the slow production cycles.

Therefore, one object of this invention is to provide an improved process of forming thermoplastic containers having flared openings.

Another object of this invention is to provide a novel process for producing a plastic container for dispensable material having at least one dispensing opening sealed with a metal cap.

According to one embodiment of this invention, an elongated hollow body of plastic material is formed having at least one and preferably a series of spaced ridges about the circumference thereof. The plastic body is then severed into at least two and preferably several segments by cutting through the apex of each of the said ridges to form plastic container bodies each having two open ends with an outwardly extending flange extending from each. These flared ends of the container bodies can then be sealed by crimping the outer periphery of the metal cover around each flange. Alternatively, a plastic cap can be affixed to each flange by heat sealing.

According to another embodiment of this invention, an enclosed elongated hollow plastic body having a single ridge positioned between either end thereof is formed and subsequently severed by cutting through the apex of the ridge to form two plastic container bodies having one open and flared end.

This invention can more easily be understood from a study of the drawings in which:

FIGURE 2 illustrates a blow molding apparatus which may be used in the process of this invention;

FIGURE 3 illustrates a method of cuttting thermoplastic tubes; and

FIGURE 4 illustrates a cross section of a sealed container made by the process of this invention.

Figure 1:
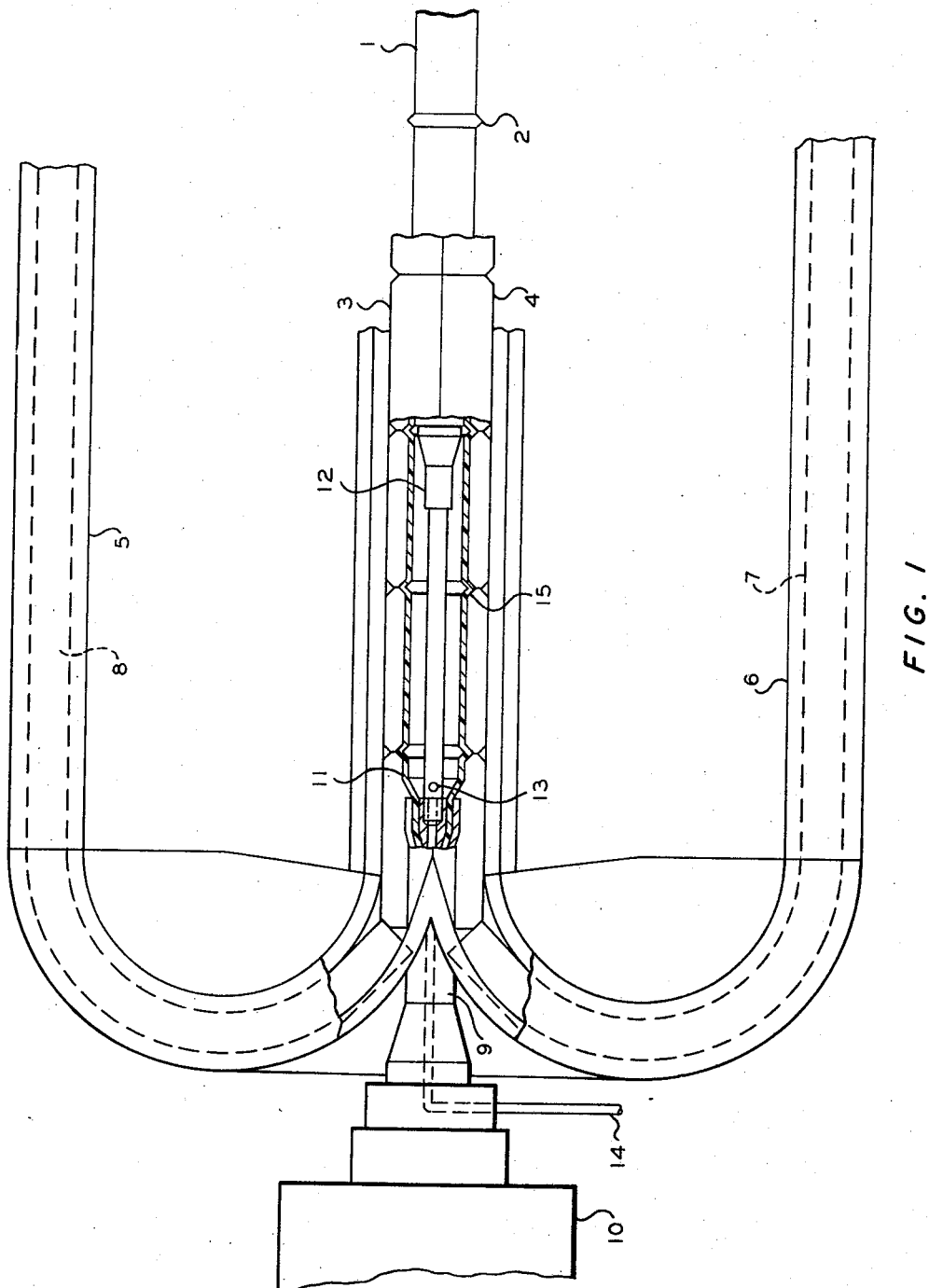
FIGURE 1 is a schematic illustration of a preferred process for producing container bodies of this invention.

Now referring to FIGURE 1 there is illustrated a revolving section molding apparatus adapted to produce a continuous length of tubing 1 having a series of equally spaced ridges 2 about the circumference thereof. This basic revolving section molding apparatus is illustrated in U.S. Patent 3,188,690. As illustrated in FIGURE 1, a plurality of semi-circular tubular mold sections 3 and 4 are arranged end to end on two endless paths 5 and 6, respectively. Endless paths 5 and 6 can be any suitable means such as guide rails 7 and 8, respectively. Guide rails 7 and 8 house drive means not shown in FIGURE 1 for advancing mold sections 3 and 4 at identical speeds. As illustrated, the ends of each mold sections 3 and 4 have semi-circular transverse internal ribs and the ribs of mold section 3 on path 5 cooperate with the ribs of mold section 4 on path 6 to form annular ribs 15 while such mold sections 3 and 4 advance along paths 5 and 6 as illustrated in FIGURE 1.

As mold sections 3 and 4 advance, they enclose around extended mandrel 9 of extruder 10 which is continuously extruding an annular tube 11 of molten thermoplastic material. Extension 12 is also attached to mandrel 9. This extension can be the supporting device illustrated in U. S. Patent 3,188,690 which prevents any undesirable deformation in tube 11 during the extruding operation. A forming fluid such as air is then passed through port 13 from conduit 14 to cause the tube 1 to expand and to conform to the desired configuration. Thus, by the use of this apparatus, a continuous tube 1 can be produced having equal spaced ridges 2 positioned about the circumference thereof. It must be noted that the internal ridge 15 can be located near the mid-point of each mold sections 3 and 4. However, it is preferred that the ridges be placed at the end of each mold section as illustrated. Tube 1 is next severed into several segments by cutting through the apex of each ridge 2 with any suitable means such as a saw or a hot knife blade. This process will be illustrated below.

It must also be noted that the molding apparatus illustrated in FIGURE 1 is in no way intended to limit the scope of this invention. FIGURE 2 illustrates a blow molding apparatus comprising mold sections 21 and 22 and injection needle 23. A heated thermoplastic parison in tubular form is clamped between mold sections 21 and 22. Needle 23 which is preferably placed at the apex of indentation 24, then punctures the tube. A forming fluid is then passed through needle 23 to expand the thermoplastic tube to conform to the internal configuration of the closed mold halves 21 and 22, to form enclosed body 25 having an external ridge 26 around the circumference thereof. Thus, the use of the molding apparatus illustrated in FIGURE 2 will yield two containers each having one flared end, by merely severing the body into two parts along the apex of ridge 26. It can be readily seen that such a tubular body with a smooth inside bore and both ends open containing one or more sections can also be formed by a corresponding injection molding operation.

The cross-sectional configuration of ridges 2 and 26 as illustrated in FIGURES 1 and 2, respectively, can be any shape desired such as semicircular, square, etc.; however, it is preferred that the ridges be formed to a V shape as illustrated in FIGURES 1 and 2. Also, the cross-sectional configuration of tube 1 and body 25 illustrated in FIGURES 1 and 2, respectively, are not intended to limit the scope of this invention. For example, round, triangular, oval, square or any desired shape can be used in the practice of this invention.

The severing of a tube 100 by a saw blade 101 to form outwardly extending flanges 102 is illustrated in FIGURE 3. Blade 101 can be any type of blade known in the art such as a knife blade, band saw blade, or a circular saw blade. The apex of each ridge is merely aligned with the center of the saw blade, and the saw is passed through body 100 to produce open ended flanged container bodies. It is readily seen that one skilled in the art can readily design various other cutting apparatus to accomplish this purpose.

After the container bodies 103 have been severed from tube 100, metal tops can be clamped to the ends thereof to form a sealed enclosure. As shown in FIGURE 4, the outer periphery 104 of a metal top 105 is securely crimped about each flange 102 by any type lid crimping apparatus known in the art which will carry out this purpose. Thus, in the normal sequence of operations, a top 105 is clamped to one end of container body 103 to form a cylindrical closed end container. A dispensable material, such as oil, powder, etc., is then deposited within the cylindrical upright open ended container. A second metal cap 105 is then clamped to the other end of container body 103 in the manner illustrated in FIGURE 4. When utilizing the enclosed body 25 as illustrated in FIGURE 2, it is readily seen that only one capping operation is needed. Alternatively a thermoplastic film or sheet can be stretched over each open end of container 103 and heat sealed on either side of flange 102.

This invention can be carried out in other specific ways than those described in the foregoing description without departing from the essential characteristics and spirit of the invention. Therefore, the embodiments described herein are to be considered illustrative and not to limit the scope of this invention.

We claim:
1. A method of forming oil container bodies comprising:
   (a) continuously extruding a tube of molten thermoplastic material;
   (b) forming a series of equally spaced V-shaped ridges about the circumference of said tube during said continuous extrusion by expanding said tube out against a forming mold by means of internal fluid pressure;
   (c) cutting said tube into segments by severing along an apex of each of said ridges to form respective cylindrical container bodies having substantially straight side walls and having each end flared outwardly from said substantially straight side walls of said cylindrical body; and
   (d) crimping the outer periphery of a metallic cover around one of said flared ends on each of said cylindrical bodies.
2. The method according to claim 1 comprising in addition: filling said thus formed cylindrical containers with oil and crimping the outer periphery of a second metallic cover around the flared open end of said container to thereby form a sealed enclosure.

References Cited

UNITED STATES PATENTS

| | | | |
|---|---|---|---|
| 2,657,431 | 11/1953 | Slaughter. | |
| 3,298,064 | 1/1967 | Jun Taga | 18—14 |
| 3,310,620 | 3/1967 | Martelli et al. | 18—14 |
| 3,348,358 | 10/1967 | Sternau | 53—42 |
| 3,410,939 | 11/1968 | Driza et al. | |
| 3,428,722 | 2/1969 | Chittenden et al. | 264—98 |

THERON E. CONDON, Primary Examiner

E. F. DESMOND, Assistant Examiner

U.S. Cl. X.R.

18—14; 53—42; 264—99, 150